United States Patent [19]
Case

[11] Patent Number: 5,897,121
[45] Date of Patent: Apr. 27, 1999

[54] DRILL ATTACHMENT AND TOOL FOR ACTUATING JACKS ON TRAILERS

[76] Inventor: Gregory Case, 3373 W. Rockton Rd., Rockton, Ill. 61072

[21] Appl. No.: 09/119,188

[22] Filed: Jul. 20, 1998

[51] Int. Cl.$^6$ ........................................ B23B 5/22
[52] U.S. Cl. .............. 279/145; 254/133 R; 254/DIG. 3; 279/143
[58] Field of Search .................... 279/143, 145; 254/DIG. 3, 131, 133 R

[56] References Cited

U.S. PATENT DOCUMENTS

| | | | |
|---|---|---|---|
| 3,011,369 | 12/1961 | Russell | 408/239 R |
| 3,764,153 | 10/1973 | Miller | 279/86 |
| 4,477,096 | 10/1984 | Wallace et al. | 279/86 |
| 4,815,347 | 3/1989 | Rogers | 82/153 |
| 4,995,768 | 2/1991 | Craft | 279/143 |

*Primary Examiner*—Andrea L. Pitts
*Assistant Examiner*—Monica Smith
*Attorney, Agent, or Firm*—Leydig, Voit & Mayer Ltd.

[57] ABSTRACT

A drill attachment for transferring torque from a rotary power tool to a jack of a trailer. The drill attachment includes a sleeve portion that fits over and is connectable to the rotatable drive shaft of the trailer jack. The drill attachment includes a chuckable end for attachment to the rotary power tool. It is an advantage that the drill attachment provides an automatic and economic way to raise and lower trailer jacks. The drill attachment also provides for a power tool which is interchangeable among several different trailer jacks.

12 Claims, 2 Drawing Sheets

DRILL ATTACHMENT AND TOOL FOR ACTUATING JACKS ON TRAILERS

FIELD OF THE INVENTION

The present invention generally relates to rotary power tools, and more particularly to drill attachments for rotary power drills.

BACKGROUND OF THE INVENTION

The conventional way to raise and lower trailers such as semi-trailers, feather-light horse trailers, recreational vehicle trailers and other such trailers is to use a manually actuated trailer jack. Conventional trailer jacks commonly include a rotatable drive shaft that can be rotated by a manually driven crank arm to raise and lower the trailer as desired. A problem with manually operated jacks is that they are hard to actuate, particularly when raising the trailer. Such manually actuated jacks are particularly difficult to operate for those individuals who have arthritis or simply do not have the strength and endurance to manually crank the jack. Such manually operated jacks are also particularly burdensome for workers of warehouses and semi-trailer yards who frequently raise and/or lower multiple trailers for connection and disconnection from semi-tractors.

There are known attempts to reduce the manual labor required in raising and lowering trailers by providing either a dedicated electrical or hydraulic jack on the trailer. However, there are several drawbacks with electrical or hydraulic jacks. Electrical or hydraulic jacks are rather expensive in comparison with the overall cost of the trailer and have not met with much commercial success. The expense problem is amplified by the fact that automatically actuated jacks are dedicated to one trailer and therefore owners of multiple trailers must buy one electrical or hydraulic jack for each trailer they own.

SUMMARY OF THE INVENTION

It is therefore the primary aim of the present invention to provide an easy and economical way to raise and lower trailers.

It is therefore an object of the present invention to provide an automatic actuating device which is interchangeable among the jacks of several different trailers.

It is another object of the present invention to provide a portable automatic jack actuating device that actuates the conventional jacks of different trailers.

It is therefore a feature of the present invention to provide a drill attachment that transfers the rotary power of a drill to the rotatable drive shaft of a conventional trailer jack. The drill attachment includes a sleeve portion that is received on the drive shaft and a chuckable end for attachment to a drill. The drill attachment provides an automatic and economical way to actuate the jacks of trailers.

It is another feature of the present invention to provide a rotary power tool that is interchangeable among the jacks of several different trailers. The rotary power tool has sufficient torque output on an attachment end that is selectively connected by means to the rotatable drive shafts of different trailer jacks. It is an advantage that the rotary power tool eliminates the need for dedicated hydraulic or electrical jacks on trailers.

These and other objects and advantages of the invention will become more apparent from the following detailed description when taken in conjunction with the accompanying drawings.

Figures 1A, 1B:
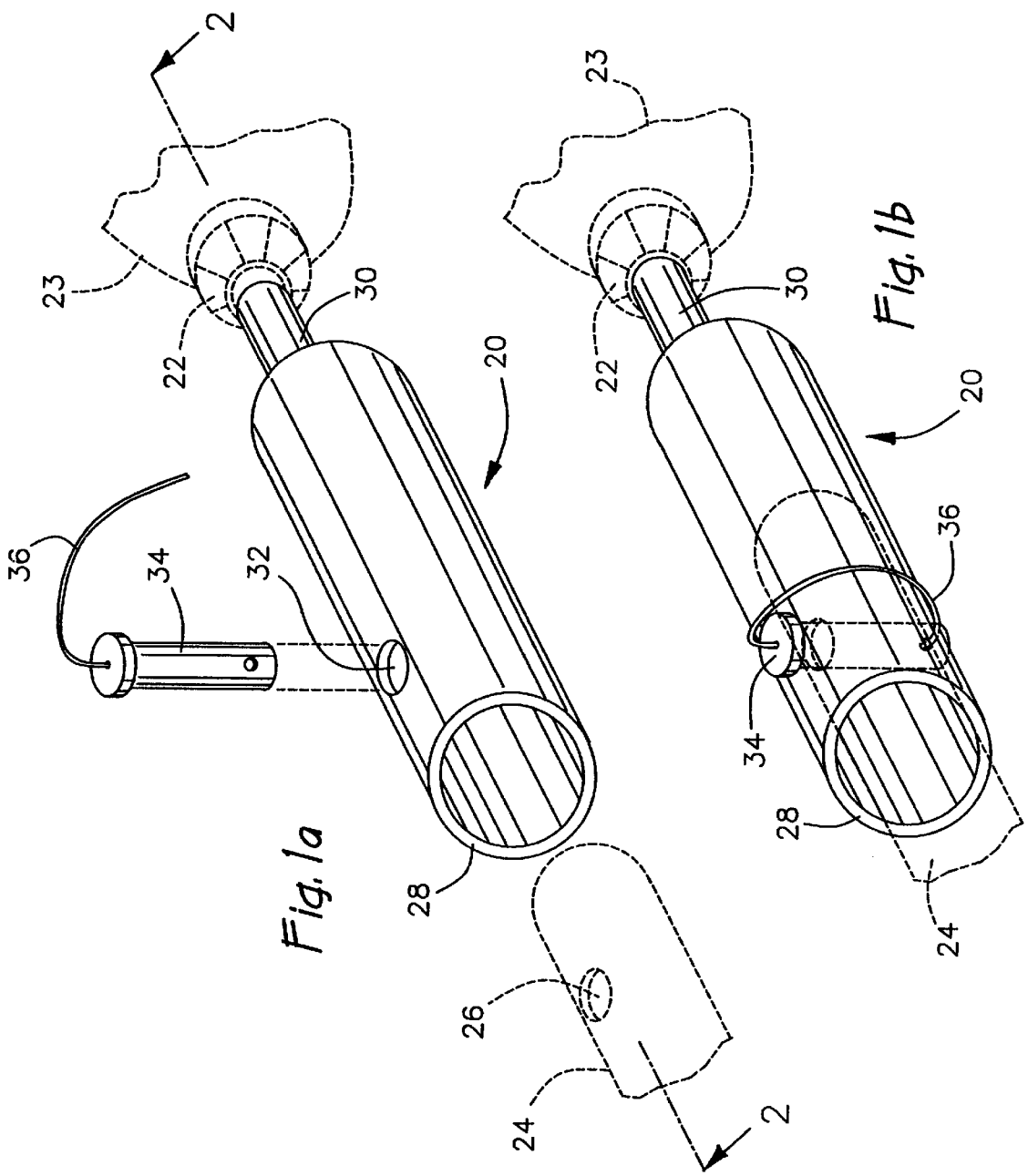
FIG. 1a is a perspective view of a drill attachment and tool according to a preferred embodiment.
FIG. 1b is a perspective view of FIG. 1 in an alternate attached position.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
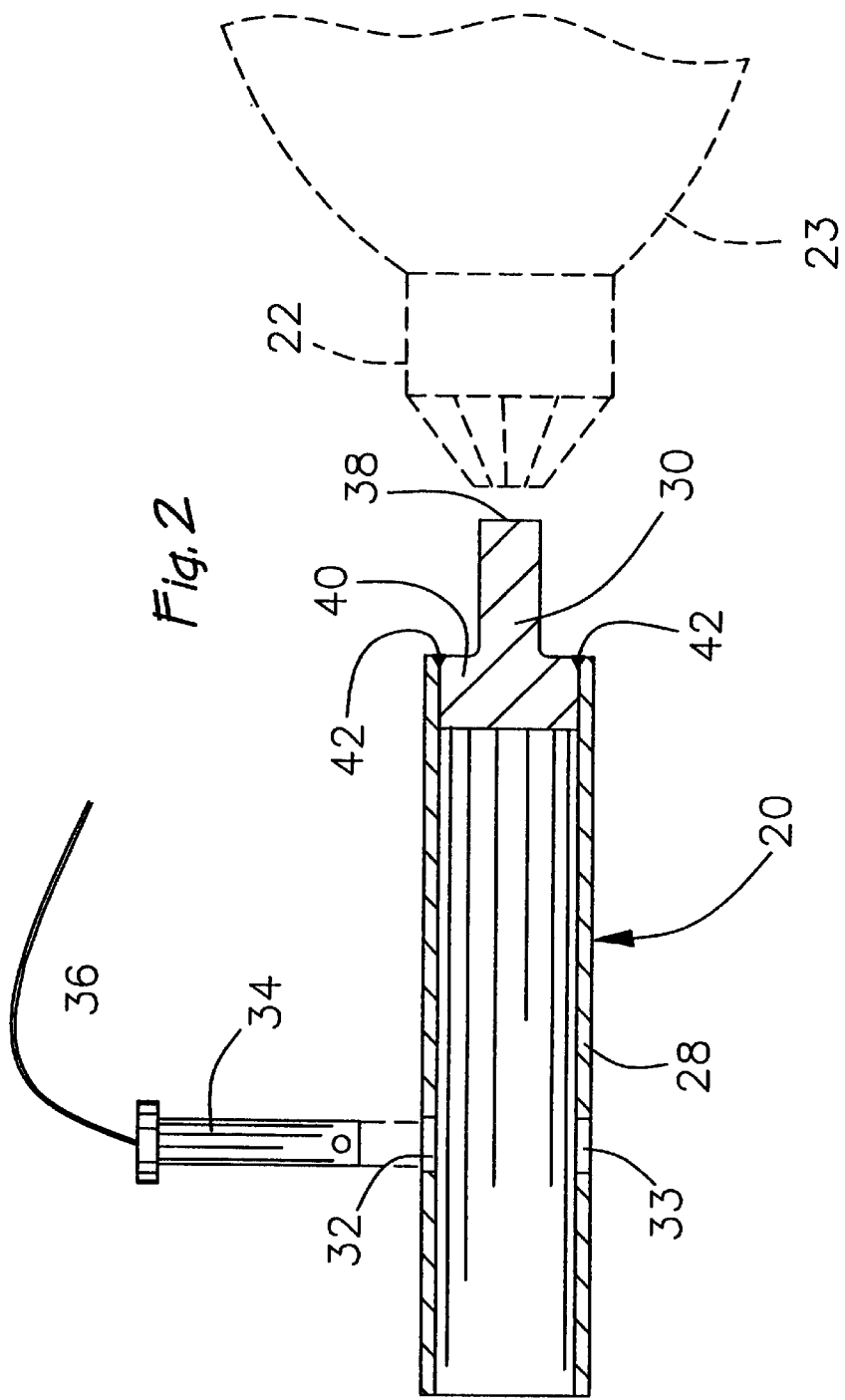
FIG. 2 is a cross-sectional view of FIG. 1a taken about line 2—2.

For purposes of illustration and referring to FIGS. 1a and 1b, a preferred embodiment of the present invention has been depicted as a drill attachment 20 for interposition between a chuck 22 of a heavy duty drill 23 and a rotatable drive shaft 24 of a conventional manually operated trailer jack. As is conventional, the drive shaft 24 of the jack typically provides a hole 26 generally orthogonal to the axis of the shaft 24 for attachment to a removable hand crank (not shown). The drill attachment 20 generally includes a sleeve portion 28 or body portion for attachment to the rotatable drive shaft 24 and an end portion 30 for attachment to the standard chuck 22 of the drill. The sleeve 28 is sized to easily fit over the shaft 24. As shown in FIG. 2, the sleeve includes two diametrically opposed openings 32, 33 or other such slots which receive a bolt 34, connection pin, or other coupling member. The bolt 34 fits through the opening 32, 33 and hole 26 when the sleeve portion 28 is fitted on the shaft with the openings 32, 33 in line with the hole 26. With the bolt 34 fitted through the openings 32, 33 and the hole 26, the drill attachment 20 is rotationally linked or coupled to the shaft 24. A locking pin 36, cotter pin, or other retaining means may be used to prevent the bolt 34 from slipping out of the hole 26. While the preferred embodiment includes two openings 32, 33, it will be appreciated to those of skill in the art that it is also possible to provide only one slot in the sleeve with a screw or other fastening member fitted through the single slot and into the hole 26 of the drive shaft 24 or such coupling means. These broader aspects are covered by certain of the broader claims appended hereto.

In practicing the preferred embodiment, the drill attachment 20 is selectively attached and detached to the chuck 22 of the drill 23. However, if use of the drill 23 for other operations is not needed, the drill attachment 20 may be permanently fixed on the drill 23 or other rotary power tool thereby forming a dedicated tool. In accordance with the object of interchangeability, the drill attachment 20 can selectively be connected and disconnected to rotatable shafts of jacks as desired. It is an advantage that the drill attachment provides an easy yet economical way to raise and lower trailers.

When practicing the invention, the drill 23 needs sufficient power to raise and lower the trailer and is preferably reversible so that the trailer can be both raised and lowered as desired. An electric drill having a 7.0 amphere rating for 450 rpm's, such as the commercially available ½ inch Milwaukee Heavy Duty Reversible Drill, is sufficient to raise and lower most trailers using the preferred embodiment of the drill attachment 20. Also, the drill attachment 20 must also have sufficient strength for transferring torque from the drill 23 to the drive shaft 24 of the trailer jack. As can be seen from the drawings, the preferred embodiment is constructed from two separate steel components including tube steel for the sleeve 28 and rod steel for the end portion 22. It will be appreciated to those of skill in the art that the drill attachment 20 alternatively may be integrally formed from steel or other suitable materials by forging, die casting or other such manufacturing operations. The drill attachment 20 provides the strength necessary to transfer torque from the heavy duty drill 23 to the rotatable shaft 24. In the preferred embodiment as shown in FIG. 2, the rod steel is lathed to form the end portion 30 to include an axially projecting chuckable stem 38 which is readily received and connectable to the standard chuck 22 and a radially projecting flange portion 40 for fastening to the sleeve portion 28. The flange portion 40 is welded or otherwise fixed to the sleeve portion (welds indicated at 42) to rigidly fix the end portion 30 to the sleeve 28. To provide sufficient strength and sufficient clearance for receiving the rotatable shafts 24 of trailer jacks, the tube steel of the sleeve 28 has an outer diameter of about 1 inch and a thickness of about a ⅛ of an inch in the preferred embodiment, while the chuckable stem portion 32 has a diameter of about ½ of an inch.

Thus, there has been provided a DRILL ATTACHMENT AND TOOL FOR ACTUATING JACKS ON TRAILERS which fully satisfies the objects, aims, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations that fall within the spirit and broad scope of the appended claims.

What is claimed is:

1. A drill attachment for interposition between a chuck of a drill and a rotatable drive shaft of a trailer jack, the rotatable drive shaft defining a hole orthogonal to the axis of the drive shaft, the drill attachment comprising:

a sleeve portion having first and second ends, the first end providing an opening sized to receive the rotatable drive shaft, the sleeve portion defining at least one slot that lines up with the hole when the sleeve portion is fitted on the rotatable drive shaft;

a chuckable end portion joined at the second end, the chuckable end portion including a stem portion projecting axially from the second end, the stem portion connectable to the chuck;

a coupling member sized to slidably fit through the at least one slot and into the hole when the sleeve portion is fitted on the drive shaft to couple the drill attachment to the rotatable drive shaft; and wherein the sleeve portion and the chuckable end portion have sufficient strength to transfer torque from the drill to the trailer jack when the sleeve portion is fitted on the drive shaft thereby to raise and lower the trailer jack.

2. The drill attachment of claim 1 wherein the at least one slot comprises two diametrically opposed slots, the coupling member slidably fitting through the two diametrically opposed slots and the hole.

3. The drill attachment of claim 2 further comprising means for retaining the coupling member on the sleeve portion when the coupling member is fitted through diametrically opposed slots.

4. The drill attachment of claim 1 wherein the sleeve has a diameter of about 1 inch and a thickness of about ⅛ of an inch.

5. The drill attachment of claim 4 wherein the stem portion has a thickness of about ½ of an inch.

6. A power tool for raising and lowering the jacks on a plurality of trailers, the jacks having rotatable drive shafts for actuation thereby, comprising:

a reversible rotary power tool having sufficient torque output for rotating the drive shaft to individually actuate the jacks;

an attachment end connected to the rotary power tool to receive the sufficient torque output; and means for interchangeably connecting the attachment end to the drive shafts of the jacks.

7. The power tool of claim 6 wherein the attachment end is detachable from the rotary power tool.

8. The power tool of claim 7 wherein the attachment end comprises a drive sleeve joined to a chuckable end, the drive sleeve sized to fit over the drives shafts and selectively connect thereto.

9. The power tool of claim 8 wherein the drive sleeve defines diametrically opposed openings for receiving a coupling member.

10. A drill attachment for interposition between a chuck of a drill and a rotatable drive shaft of a trailer jack, the drill attachment comprising:

an axially projecting stem portion connectable to the chuck;

a body joined to the stem portion for positioning the drill attachment in association with said rotatable drive shaft;

means on said body portion for coupling the body to the rotatable drive shaft; and wherein the body and the stem portion have sufficient strength to transfer torque from the drill to the trailer jack thereby to raise and lower the trailer jack.

11. The drill attachment of claim 10 wherein said body includes a sleeve portion coaxial with the stem portion, the sleeve portion defining first and second ends, the first end providing an opening sized to receive the rotatable drive shaft, the second end being joined to the stem portion.

12. The drill attachment of claim 11 wherein the coupling means comprises a coupling member and the sleeve portion defines opposed slots, the coupling member slidably fitting through said opposed slots.

* * * * *